May 13, 1958  A. F. PARIS  2,834,526
COMBINATION TRUCK AND LADDER
Filed Aug. 9, 1956  2 Sheets-Sheet 1
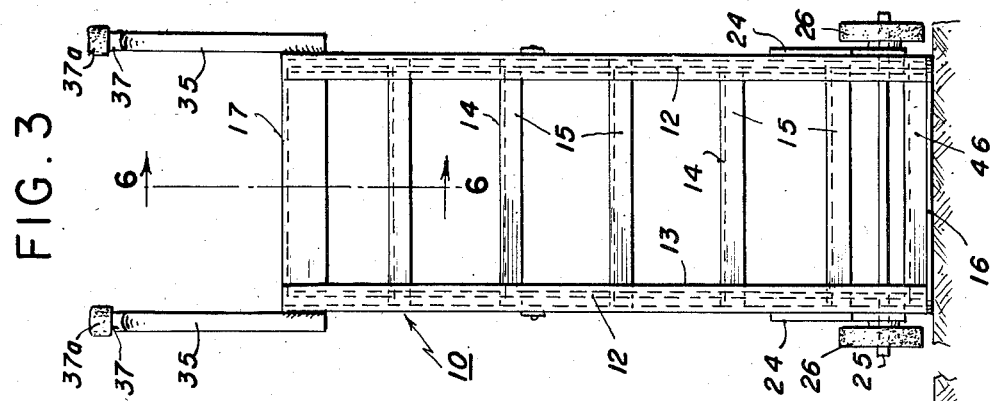
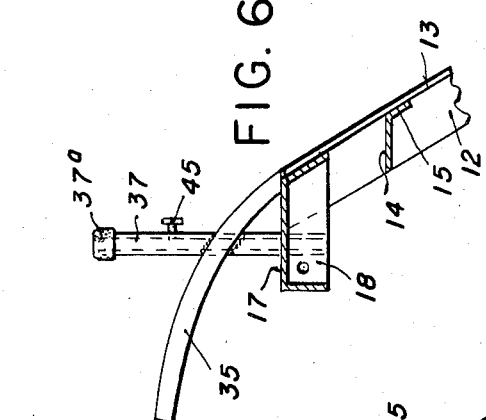
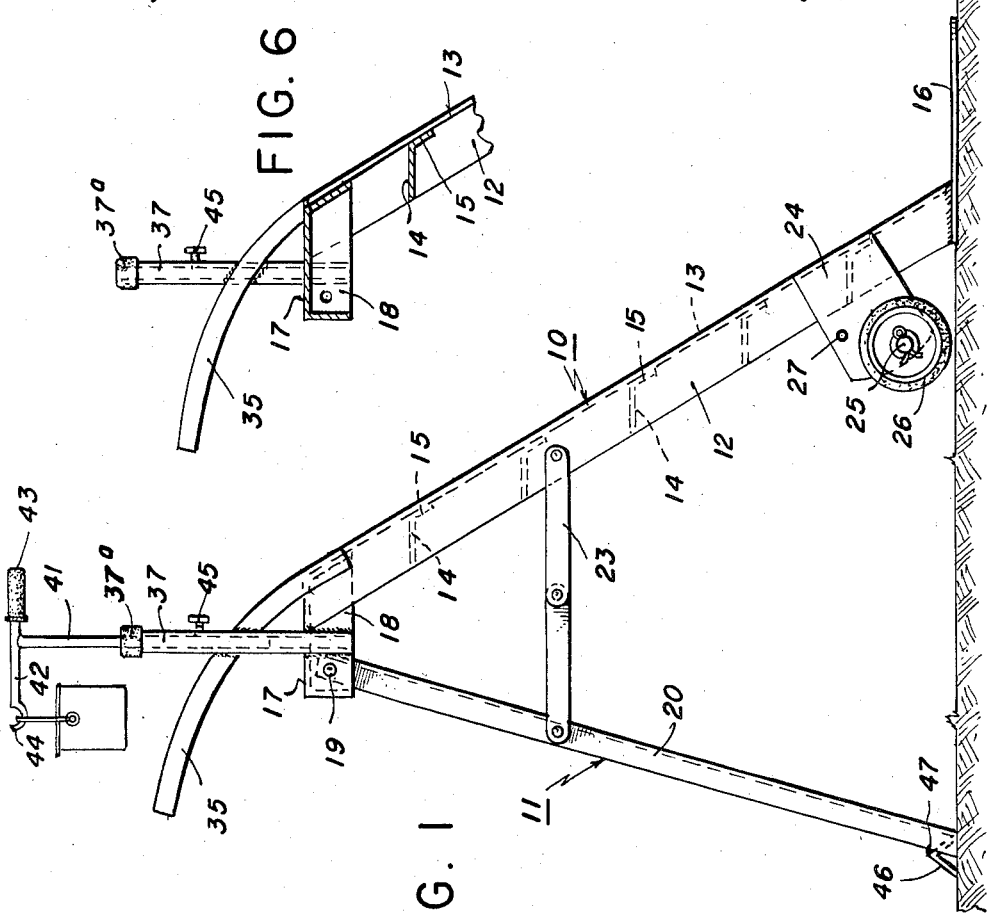
INVENTOR
AUGUST F. PARIS
BY
ATTORNEYS May 13, 1958  A. F. PARIS  2,834,526
COMBINATION TRUCK AND LADDER
Filed Aug. 9, 1956  2 Sheets-Sheet 2
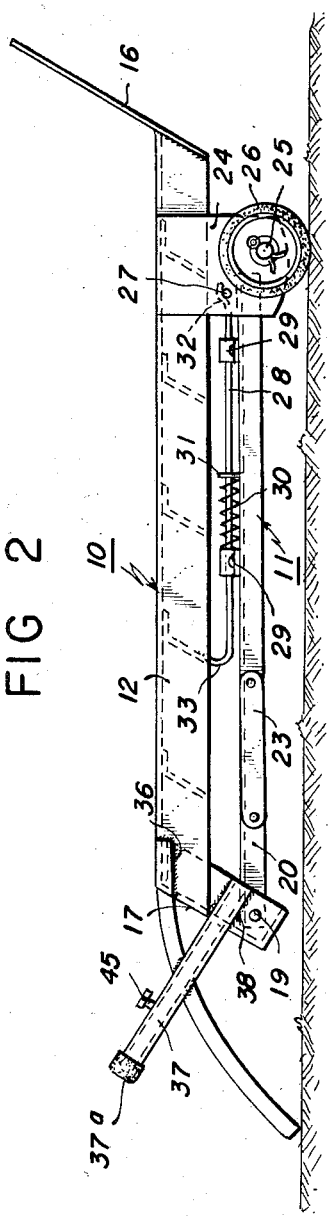
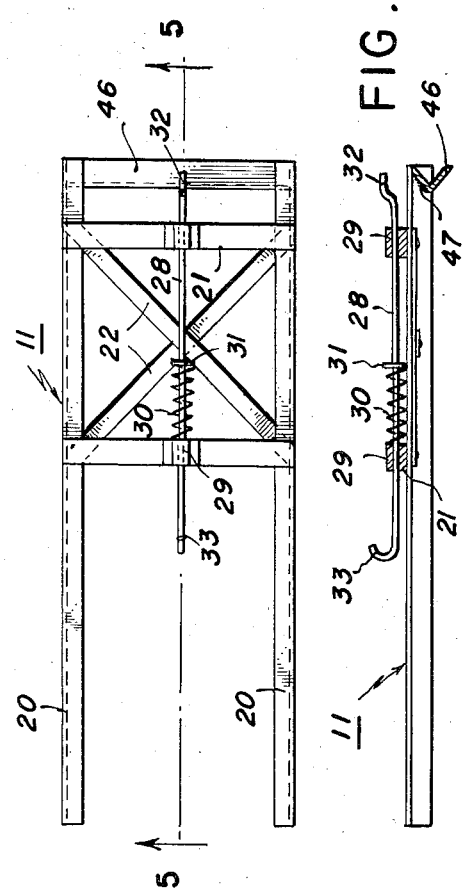
INVENTOR
AUGUST F. PARIS
BY *H. B. Willson & Co.*
ATTORNEYS

United States Patent Office 2,834,526
Patented May 13, 1958

2,834,526

COMBINATION TRUCK AND LADDER

August F. Paris, Brockway, Pa.

Application August 9, 1956, Serial No. 603,034

2 Claims. (Cl. 228—16)

This invention relates to combined stepladders and wheeled hauling trucks.

The principal object of the invention is to provide an improved combination unit of this character which while useable in the home and about the farm, is particularly useful in stores and industrial establishments for transporting packages and boxes to and from storage places and for facilitating the arrangement of them on tiers of shelves.

Another object of the invention is to provide a combination device of this character which is strong and durable, safe in use, and capable of being sold at a comparatively reasonable price.

Another object is to provide near the bottom of the stepladder portion, rearwardly disposed truck wheels and an improved latching means between that portion and the folding leg member of the ladder so that the device may be effectively used as a hauling truck.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of the device set up for use as a stepladder;

Fig. 2 is a similar view showing the parts positioned for use as a truck;

Fig. 3 is a front view of Fig. 1;

Fig. 4 is a detail rear elevation of the leg member and its latch;

Fig. 5 is a section on line 5—5 in Fig. 4; and

Fig. 6 is a detail sectional view on the line 6—6 in Fig. 3.

The device is made of metal, preferably a lightweight metal such as aluminum, the angle metal bars, straight strips and flat plates being welded or otherwise suitably connected. It comprises a load supporting body 10 and a foldable leg member 11 for supporting the upper end of the body when the latter is in an inclined upright position for loading. The body 10 has two parallel side rails 12 of angular shape in cross section, with their wide flanges in opposed relation and their narrow flanges 13 extending inwardly at the front of the body. The rails 12 are spaced apart by a longitudinal series of spaced transverse bars 14 of angular shape in cross section as seen in Figs. 3 and 6. The wide flanges of the cross bars 14 are disposed to serve as steps when the device is set up as a ladder, as seen in Fig. 1, while the narrow flanges 15 are at the front of the body and serve to support a load on the truck. Connecting the lower ends of the rails 12 is forwardly projecting rectangular metal plate 16 which serves to support the lower end of the load. This lower platform plate 16 is disposed at an angle as shown to the length of the body and is of substantial area so that when it rests on the floor or ground it will hold the lower end of the body steady.

The upper ends of the side rails 12 are connected to an inverted box-like upper platform 17 consisting of a flat rectangular plate disposed in a plane parallel to that of the lower plate 16 and having surrounding depending flanges 18, the front flange being at an obtuse angle. The flanged rails 12 are disposed at the front corners of the plate 17 and their wide flanges are welded against the outer faces of the front ends of the side flanges 18, as seen in Figs. 1 and 6. Passing through the rear portions of these flanges is a transverse pivot rod 19 on which the leg member 11 is hung for folding against the rear of the body into substantially parallel relation therewith, as seen in Fig. 2. The leg member is of rectangular shape and is shorter than the body 10. It comprises a pair of parallel angle metal side bars 20 spaced apart by a pair of longitudinally spaced cross bars 21 and associated diagonal braces 22, these parts being adjacent the lower end of the member. The upper ends of the side bars are disposed between the side flanges 18 and are apertured to receive the pivot rod 19. To limit the swinging movement of the leg member away from the body, the parts have their intermediate portions connected by a collapsible brace 23 such as a pair of toggle links as commonly used on stepladders.

Welded to the outer side faces of the rails 12 are a pair of laterally opposed and substantially rectangular bracket plates 24 which project rearwardly and are spaced above the lower ends of the rails 12. Extending through the lower rear portions of these brackets is a transverse shaft 25 having on its projecting ends a pair of supporting wheels 26. These wheels are of such size and are so mounted that their peripheries do not project beyond the plane of the upper face of the plate 16 so that the wheels will be in a non-supporting position when said plate rests on the ground or floor. Also mounted between the inner and upper portions of the brackets is a transverse bar or rod 27 which serves both as a stop to limit the folding movement of the leg member and also as a keeper for a latch device for holding the leg member folded. The latch comprises a longitudinally slidable rod 28 disposed midway of the side bars 20 and mounted in bearings 29 on the cross bars 21, as seen in Figs. 4 and 5. A coil spring 30 surrounds the latch rod between the upper bar 21 and a transverse pin 31 in the rod and serves to project the rod downwardly to move its laterally offset lower end 32 into locking engagement with the keeper rod 27 when the free end portions of the bars 20 engage that rod. At the upper end of the latch rod is a hook-shaped finger piece 33 to permit the rod to be pulled up against the tension of the spring when it is desired to lock or unlock the leg member.

A pair of longitudinally curved combined handle bars and supporting feet 35 are provided at the upper end of the body 10. These may be metal rods or pipe sections which have their lower ends welded at 36 to the front portions of the outer faces of the angle rails 12. They extend upwardly and rearwardly to serve as handles when the truck is moved on its wheels 26 and also as supporting feet when the body 10 is disposed in a horizontal or substantially horizontal position as seen in Fig. 2, with the leg member 11 in folded position. When the truck is loaded in this horizontal position, it may be more conveniently lifted by grasping a pair of tubular posts 37 disposed at the ends of the top plate 17 and in perpendicular relation to the plane of said plate. These posts 37 have their lower ends welded at 38 to the flanges 18 and they are also welded to the handles 35 where they cross the same. The posts serve not only as lifting handles but as tubular standards in which combined handle and bucket supports are verticaly adjustable and removably mounted. One or both of these supports may be used when the device is used as a ladder by a person standing on or near the top of the same. Each comprises a T-shaped member having an upright tube or rod 41 to slide in the top of one of the posts or standards 37 and a cross piece 42 having at one end a hand grip 43 and at its other end a hook 44 to receive the bail of a can of paint, a bucket of wash water or a similar receptacle. The rods 41 are adjustably fixed by set screws 45 in the posts. When these screws are loosened the rods 41 may be removed from the lifting handles or posts 37. At the upper ends of the latter I preferably provide ring-like guard tips 37a of rubber or the like through which the rods 41 are freely movable. In order to prevent the angle metal bars 20 of the leg member from sinking into soft ground when the device is used as a stepladder, a V-shaped angle metal cross bar 46 is disposed adjacent the lower ends of the bars 20, as shown in Figs. 1, 4 and 5. This angle metal cross bar 46 is disposed in an inverted position with its two diverging flanges extending downwardly; and one of its flanges has its ends welded at 47 to the inner faces of opposed flanges of the two bars 20. The bar 46 not only braces the leg structure 11 but effectively prevents the latter from sinking into soft ground. This makes the device safer when used in an orchard or around the outside of a house since it insures that the platform plate 16 will be disposed horizontally or flat on the ground and not in a tilted position.

While as above noted the device may be used as a ladder for painting, cleaning walls, ceilings and windows, picking fruit and pruning trees on the farm, etc., it is especially useful for stock boy duties in stores and industrial establishments, since when the device is set up as shown in Fig. 1, the body 10 cannot slide or shift while boxes or cartons are loaded on the base platform 16 and against the front of the truck body. When a number of lightweight boxes are to be carried, they may be placed on the body when it is in a flat position shown in Fig. 2, since in that position the handles 35 serve as feet to support the body in a substantially horizontal position.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A wheeled truck useable as a stepladder and having a load-carrying body and a foldable leg member pivoted at its upper end to the rear of the top portion of the body to support the latter in an inclined position for loading and foldable into parallel relation with the rear of the body, the body having at its top rearwardly curved handles to serve as body-supporting feet when the body is disposed horizontally for loading with the leg member in folded position beneath it, a flat load supporting platform plate projecting forwardly from the lower end of the body and disposed horizontally for supporting engagement with the floor or ground when the body is in its inclined position, a pair of laterally-opposed bearing bracket plates projecting rearwardly from the lower end portion of the body in upwardly spaced relation to said platform plate, a transverse shaft mounted in the lower portions of said bracket plates, a pair of ground-engaging wheels mounted on the end portions of said shaft, the peripheries of said wheels being disposed above the plane of said platform plate, whereby they will be spaced above the ground when the body is in its inclined position, a combined stop and keeper rod having its ends mounted in the upper portions of said bracket plates and engageable by said leg member to limit its folding movement, and manually-retractable spring projected latch means carried by the lower portion of said leg member and engageable with said keeper rod to hold the leg member in its folded position when the truck is used for hauling a load.

2. A wheeled truck useable as a stepladder and having a load-carrying body and a foldable leg member pivoted at its upper end to the rear of the top portion of the body to support the latter in an inclined position for loading and foldable into parallel relation with the rear of the body, the body having at its top rearwardly curved handles to serve as body-supporting feet when the body is disposed horizontally for loading with the leg member in folded position beneath it, a flat load supporting platform plate projecting forwardly from the lower end of the body and disposed horizontally for supporting engagement with the floor or ground when the body is in its inclined position, said leg member having spaced side bars connected by cross bars, and also having a ground-engaging bar fixed at its ends adjacent the lower ends of the side bars, said last mentioned bar being of inverted V-shape in cross section with its flanges directed downwardly to engage the ground when the body is supported by the leg member in its inclined position, a pair of laterally-opposed bearing bracket plates projecting rearwardly from the lower end portion of the body in upwardly spaced relation to said platform plate, a transverse shaft mounted in the lower portions of said bracket plates, a pair of ground-engaging wheels mounted on the end portions of said shaft, the peripheries of said wheels being disposed above the plane of said platform plate, whereby they will be spaced above the ground when the body is in its inclined position, a combined stop and keeper rod having its ends mounted in the upper portions of said bracket plates and engageable by said leg member to limit its folding movement, and a spring projected latch rod disposed longitudinally of the leg member at its lower end and slidable in bearings on said cross bars, said latch rod having an offset end to take over said keeper rod to hold the leg member in its folded position when the truck is used for hauling a load.

References Cited in the file of this patent

UNITED STATES PATENTS

| 1,116,779 | Witt | Nov. 10, 1914 |
| 1,193,043 | Merrin | Aug. 1, 1916 |
| 1,881,113 | Anderson | Oct. 4, 1932 |
| 1,992,108 | White | Feb. 19, 1935 |

FOREIGN PATENTS

| 107,014 | Germany | Dec. 9, 1899 |